3,399,223
THERMAL REDISTRIBUTION OF ALKOXYMETHYLPOLYSILANES AND PRODUCTS THEREOF

William H. Atwell and Donald R. Weyenberg, Midland, Mich., assignors to Dow Corning Corporation, Midland, Mich., a corporation of Michigan
No Drawing. Filed Feb. 24, 1966, Ser. No. 529,648
8 Claims. (Cl. 260—448.8)

This application relates to the process comprising heating under neutral conditions, at a temperature of 165° to 350° C., a polysilane of the formula

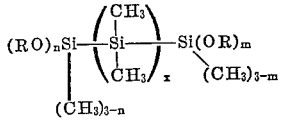

where R is a lower alkyl radical, $m$ has a value of 1 to 3, $n$ has a value of 0 to 3, and $x$ has a value of 0 to 1, whereby a redistribution between Si—Si bonds and SiOR bonds in said polysilane occurs.

It has been unexpectedly found that the neutral pyrolysis of the above polysilanes has distinct advantages over the base-catalyzed redistribution of the type described in Ryan, J.A.C.S., 84, 4730 (1962). For example, the base-catalyzed redistribution of

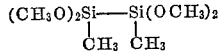

results in the production of a non-volatile, high polymeric residue, while Example 3 of this application shows that the pyrolysis of the same composition results in a significant yield of an isolatable branched tetrasilane which is a new composition of matter.

In the above process, R can be any lower alkyl radical such as methyl, ethyl, isopropyl or sec.-butyl.

The rate of the process is dependent on the reaction temperature and on the number of alkoxy groups present in the molecule; the rate being greater when more alkoxy groups are present.

The redistribution of Si—Si bonds and SiOR bonds can be illustrated by the general reaction:

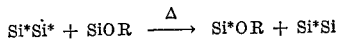

or by a complete reaction:

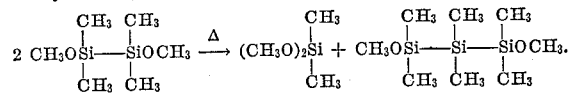

All products which could hypothetically be made by this redistribution process are usually found in the crude product of this process, although the yields of some may be very small.

The process must be performed under essentially anhydrous conditions in order to prevent hydrolysis of the SiOR bond but the reaction time and the pressure used appear to be not critical.

When the process of this invention is applied to a disilane of the formula

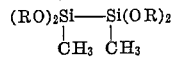

where R is a lower alkyl radical, a product of the formula

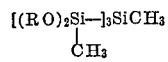

is recovered in significant yield. This material is a useful crosslinking agent for silicone elastomers and resins which cure by hydrolysis and condensation, and it is further useful in the preparation of highly branched silicone fluids.

When the process of this invention is applied to a disilane of the formula

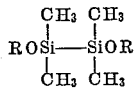

where R is defined above, the reaction temperature being preferably at least 250° C., a substantial yield of polysilanes of the formula

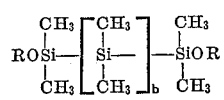

is recovered in a few hours of reaction where $b$ has a value of 2, 3, 4, 5 and higher.

The above higher polysilanes absorb ultraviolet light which has a wavelength in the neighborhood of 250 m$\mu$, and are therefore useful as sunscreening agents. They are also useful in the preparation by hydrolysis of linear poly-(silane-siloxanes) which are useful ingredients for silicone elastomers and fluids.

The term "neutral conditions" is meant to imply the absence of significant amounts of acid or alkali. Traces of alkalinity such as might be caused by the alkalinity of the glass apparatus in which the process is performed appear not to change the characteristics of the reaction to those of the reaction of Ryan, cited above. Correspondingly, the presence of acids such as chlorosilanes do not significantly alter the reaction as long as the acid is anhydrous and is not a catalyst for side reactions such as the redistributions of SiCH₃ bonds.

The following examples are illustrative only and should not be construed as limiting the invention, which is properly delineated in the appended claims.

EXAMPLE 1

Two samples of

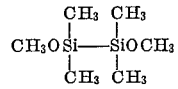

were heated for 16 hours in a tube at 200° and 300° C. respectively.

The product was analyzed by a gas-liquid chromatography, and was found to consist of polysilanes of the formula

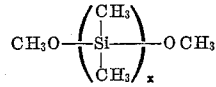

in the following percentages, as determined from their area percents of the G.L.C. spectrum:

| Sample heated at— | G.L.C. area percent where $x$ equals— | | | | | |
|---|---|---|---|---|---|---|
| | 2 | 3 | 4 | 5 | 6 | 7 |
| 200° C | 89 | 11 | | | | |
| 300° C | | 12.1 | 19.8 | 26.4 | 24.2 | 17.6 |

A large amount of dimethyldimethoxysilane was also recovered.

EXAMPLE 2

The experiment of Example 1 was repeated, using

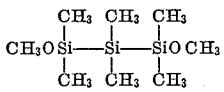

as the reactant and using a reaction temperature of 300° C.

The products were similar to those of Example 1, the polysilanes being made up of $$CH_3O-\left(\underset{\underset{CH_3}{|}}{\overset{\overset{CH_3}{|}}{Si}}\right)_x-OCH_3$$

where the proportions of each value of $x$ being as follows:

| G.L.C. area percent where $x$ equals— | | | | |
|---|---|---|---|---|
| 3 | 4 | 5 | 6 | 7 |
| 29.8 | 38.0 | 22.2 | 7.6 | 2.9 |

EXAMPLE 3

Forty-two grams of $$(CH_3O)_2Si-Si(OCH_3)_2$$
$$\underset{CH_3}{|}\quad\underset{CH_3}{|}$$

were heated at about 185° C. with a cooled reflux-distillation column which permitted the removal of the evolved methyltrimethoxysilane without the loss of other products. After 30 hours of operation, 23.2 g. of methyltrimethoxysilane had been removed and collected.

Distillation of the residue yielded 5 g. (a 21% yield) of $$[(CH_3O)_2Si]_3SiCH_3$$
$$\underset{CH_3}{|}$$

B.P. 110–111° C. at 1.8 mm. of pressure. The remaining residue was a colorless, viscous oil which consisted of higher polysilanes containing methyl and methoxy substituents.

EXAMPLE 4

Small samples of 1,1,2-trimethyltrimethoxydisilane were heated at 200° C. to yield a substantial amount of dimethyldimethoxysilane, methyltrimethoxysilane, and a high polysilane residue similar to that of Example 3.

EXAMPLE 5

Small samples of pentamethylmethoxydisilane were heated at 300° C. for 16 hours to yield a substantial amount of trimethylmethoxysilane and a viscous higher polysilane residue.

EXAMPLE 6

The experiment of Example 1 was repeated three times, heating for 16 hours at 200° C.

One run was performed in an alkali glass tube; one was performed in an alkali glass tube containing a trace of trimethylchlorosilane; and one was performed in a stainless steel tube.

Equivalent results to those of Example 1 were obtained in each case.

EXAMPLE 7

When a small amount of hexamethoxydisilane is heated at 300° C. for one minute, a substantial yield of tetramethoxysilane and octamethoxytrisilane is produced.

EXAMPLE 8

When $$(C_2H_5O)_3Si-\underset{\underset{CH_3}{|}}{Si}(OC_2H_5)_2$$

is heated for one hour at 250° C., a substantial yield is recovered of ethylorthosilicate, methyltriethoxysilane, and various penta-, hexa-, and hepta-silanes.

EXAMPLE 9

Several grams of 1,2-di(n-butoxy)tetramethyldisilane were heated at 275° C. for 16 hours to yield a substantial amount of di(n-butoxy)dimethylsilane and a mixture of polysilanes of the formula $$C_4H_9O-\left(\underset{\underset{CH_3}{|}}{\overset{\overset{CH_3}{|}}{Si}}\right)_x-OC_4H_9$$

where x has a value of 3, 4, 5, 6, and higher.

That which is claimed is:

1. The process comprising heating under neutral conditions, at a temperature of 165° to 350° C., a polysilane of the formula $$(RO)_nSi-\left(\underset{\underset{CH_3}{|}}{\overset{\overset{CH_3}{|}}{Si}}\right)_x-Si(OR)_m$$
$$\underset{(CH_3)_{3-n}}{|}\qquad\underset{(CH_3)_{3-m}}{|}$$

where:
R is a lower alkyl radical,
m has a value of 1 to 3,
n has a value of 0 to 3, and
x has a value of 0 to 1, whereby a redistribution between Si—Si bonds and SiOR bonds in said polysilane occurs.

2. The process of claim 1, said polysilane being of the formula $$(CH_3O)_2Si-Si(OCH_3)_2$$
$$\underset{CH_3}{|}\quad\underset{CH_3}{|}$$

3. The process of claim 1, said polysilane being of the formula $$CH_3O\underset{\underset{CH_3}{|}}{\overset{\overset{CH_3}{|}}{Si}}-\left(\underset{\underset{CH_3}{|}}{\overset{\overset{CH_3}{|}}{Si}}\right)_{x'}-\underset{\underset{CH_3}{|}}{\overset{\overset{CH_3}{|}}{Si}}OCH_3$$

where $x'$ has a value of 0 to 1.

4. A polysilane of the formula $$[(RO)_2Si]_3SiCH_3$$
$$\underset{CH_3}{|}$$

where R is a lower alkyl radical.

5. The polysilane of claim 4 where R is methyl.

6. A polysilane of the formula $$RO\underset{\underset{CH_3}{|}}{\overset{\overset{CH_3}{|}}{Si}}-\left(\underset{\underset{CH_3}{|}}{\overset{\overset{CH_3}{|}}{Si}}\right)_b-\underset{\underset{CH_3}{|}}{\overset{\overset{CH_3}{|}}{Si}}OR$$

where R is a lower alkyl radical and b has a value of at least 2.

7. The polysilane of claim 6 where R is methyl.
8. The polysilane of claim 6 where R is n-butyl.

References Cited

UNITED STATES PATENTS 3,308,146   3/1967   Merker _____ 260—448.8 XR

OTHER REFERENCES

Ryan, J.A.C.S., 84, pp. 4730–34, Dec. 20, 1962.
Stone et al.: "Advances in Organometallic Chemistry," vol. 4, Academic Press, N.Y. (1966), pp. 1 to 38.

TOBIAS E. LEVOW, *Primary Examiner.*

P. F. SHAVER, *Assistant Examiner.*